Sept. 5, 1944.  F. A. RICHARDS  2,357,426
HOPPLE FOR COWS
Filed May 28, 1943   2 Sheets-Sheet 1
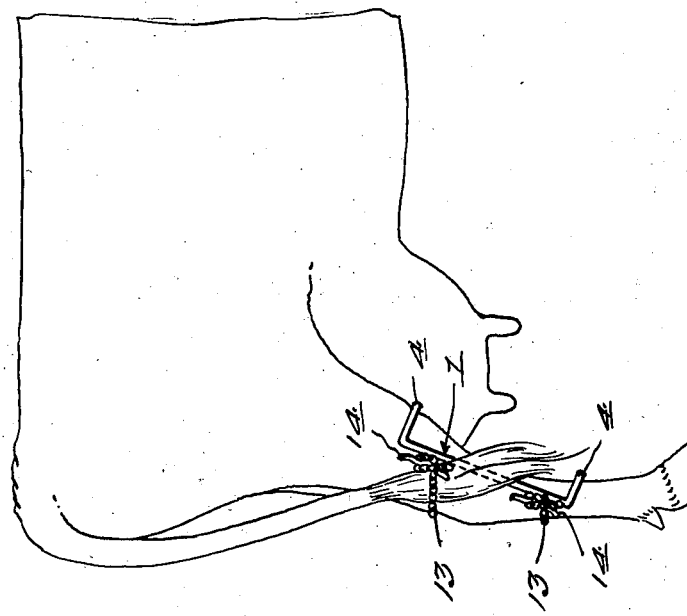
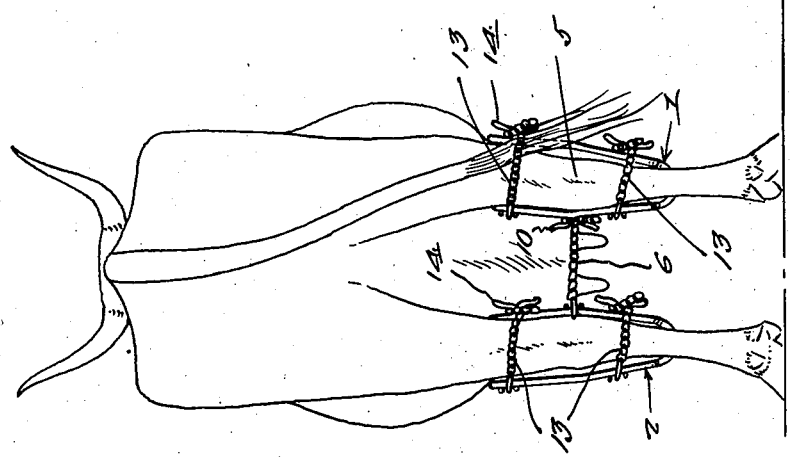
Inventor
Fred A. Richards
By Clarence A. O'Brien
and Harvey B. Jackson
Attorneys

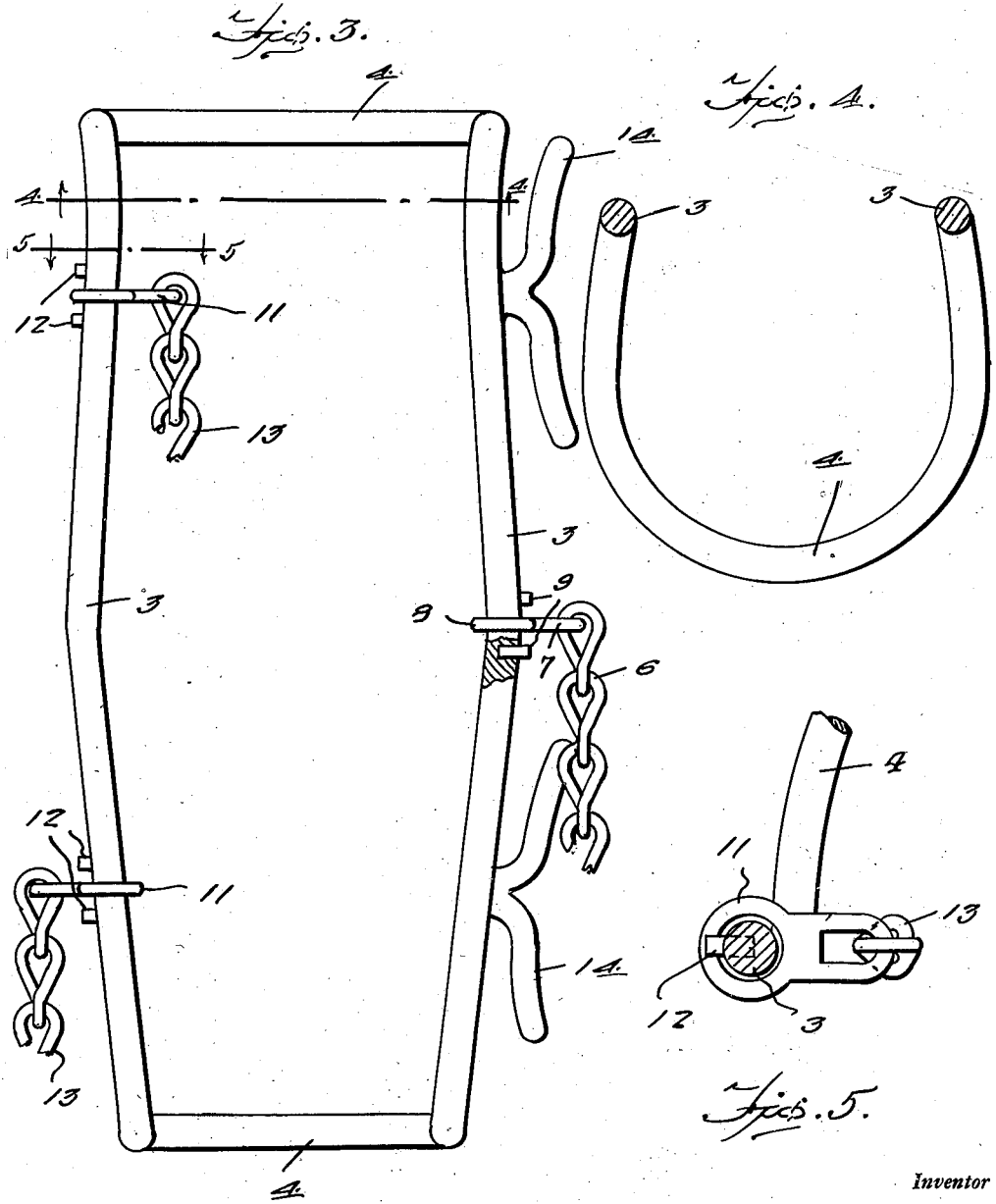

Patented Sept. 5, 1944

2,357,426

UNITED STATES PATENT OFFICE 2,357,426

HOPPLE FOR COWS

Fred A. Richards, Lone Rock, Wis.

Application May 28, 1943, Serial No. 488,893

1 Claim. (Cl. 119—127)

My invention relates to improvements in hopples, or shackles, for cows, the principal object in view being to provide simply constructed equipment of the character indicated which may be easily applied to and removed from the hind legs of a cow and which will positively prevent her from kicking but will not irritate the animal so as to prevent her from letting down milk, nor, injure the legs in any manner.

To the accomplishment of the above, and subordinate objects presently appearing, a preferred embodiment of my invention has been illustrated in the accompanying drawings, set forth in detail in the succeeding description, and defined in the claim appended hereto.

In said drawings:

Figure 1 is a view in rear elevation illustrating the preferred embodiment of my invention applied, Figure 2 is a view in side elevation, Figure 3 is a view in rear elevation, partly broken away, of one of the shackles, Figure 4 is a view in transverse section taken on the line 4—4 of Figure 3, and Figure 5 is a detail view in transverse section taken on the line 5—5 of Figure 3 and drawn to an enlarged scale.

Referring to the drawings by numerals, my improved hopple comprises a pair of leg shackles 1, 2, for the right and left hind legs of the cow and each of which includes a pair of opposed side rods 3 connected together at the ends thereof in suitably spaced relation by bowed yoke members 4 adapted to fit rearwardly over the legs to partially surround the leg and dispose the side rods upon opposite sides of said leg, respectively. The shackles 1, 2 are of a length such that the yoke members 4 may be fitted to the leg well above and below the leg joint indicated at 5, and the side rods 3 are of obtuse angle form lengthwise to obviate close contact with the leg between the yoke members 4.

The shackles 1, 2 are secured together by a short chain 6 of the requisite length to permit natural standing posture of the legs of the cow but tying said shackles together so that forward movement of either leg relative to the other is limited to prevent kicking. For securing the chain 6 to the shackles 1, 2 a link 7 is rotatably mounted by an eye 8 on one side rod 3 of one shackle intermediate the ends of said rod and to which link one end of the chain 6 is connected. A pair of lateral studs 9 on the appropriate side rod 3 confine the link 7 against movement along said side rod. As will be understood, the link 7 is provided on the side rod 3 disposed on the inner side of the leg. The other end of the chain 6 is adapted to be wrapped around a T-shaped cleat 10 provided on the inside side rod 3 of the other shackle centrally of said rod and coplanar with the side rods of the shackles.

A pair of links 11, similar to link 7, is provided on one side rod 3 of each shackle 1, 2 adjacent the ends of said rod between lateral studs 12 on the rod and similar to studs 9. Each of the links 11 have secured thereto one end of a shackling chain 13. The other side rod 3 of each shackle 1, 2 is provided thereon with a pair of cleats 14 similar to cleat 10, said cleats 14 being arranged opposite the links 11 and to which the free ends of the shackling chains 13 may be attached by wrapping around or over the same.

A particular feature of my invention is that the shackling chains 13, together with the links 11 and cleats 14, are so disposed that said chains may be drawn taut on each shackle above and below the leg joint over the tendons and nerves in the rear of the leg to numb such tendons and nerves and thereby prevent the animal from attempting to use her legs.

It is to be noted that the cleats 10 and 14 extend outwardly, laterally, from the shackles 1, 2 clear of the legs of the animal.

As will be readily apparent, to remove the shackles 1, 2, it is merely necessary to detach the shackling chains 13 from the cleats 14 and the chain 6 from the cleat 10, if desired, so that the shackles may drop off the legs of the cow or be removed by hand. The upper shackling chain 13 of the right shackle 1 may be used to bind the cow's tail to the right leg, if desired.

The foregoing will, it is believed, suffice to impart a clear understanding of my invention as regards its construction, use and advantages.

Manifestly, the invention, as described, is susceptible of modification without departing from the inventive concept, and right is herein reserved to such modifications as fall within the scope of the subjoined claim.

What I claim is:

Hopple equipment for the hind legs of a cow, comprising a pair of right and left shackles, respectively, each including a pair of opposed side rods adapted to extend alongside opposite sides of a leg of the cow, respectively, opposite the joint of the leg, and a pair of bowed yoke members connecting the ends of said rods at opposite ends of the shackle and fitting forwardly around said leg above and below said joint, respectively, means for connecting the shackles together intermediate the ends thereof, and means for attaching the shackles to the hind legs of the cow, respectively, comprising a pair of flexible members connected to one side rod of each shackle, and cleats on the other side rod of each shackle for the attachment of said members thereto, said flexible members being constructed and arranged to be extended across the rear of the leg immediately above and below the joint of the leg and to be drawn taut against the rear of the leg to deaden the nerves and tendons at the rear of said leg and thereby obviate kicking.

FRED A. RICHARDS.